United States Patent
Patariu et al.

(10) Patent No.: US 7,313,239 B2
(45) Date of Patent: Dec. 25, 2007

(54) METHOD AND SYSTEM FOR DATA ENCRYPTION/DECRYPTION KEY GENERATION AND DISTRIBUTION

(75) Inventors: Kevin Patariu, San Diego, CA (US); Iue-Shuenn Chen, San Diego, CA (US); Jay Kwok Wa Li, Milpitas, CA (US); Cynthia Dang, Cerritos, CA (US); Mark Taylor Core, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 597 days.

(21) Appl. No.: 10/414,577

(22) Filed: Apr. 15, 2003

(65) Prior Publication Data

US 2004/0247128 A1    Dec. 9, 2004

(51) Int. Cl.
*H04L 9/00*    (2006.01)

(52) U.S. Cl. ...................................... 380/277
(58) Field of Classification Search ...................... None
See application file for complete search history.

(56) References Cited

U.S. PATENT DOCUMENTS

| | | | | |
|---|---|---|---|---|
| 5,016,277 | A * | 5/1991 | Hamilton | 713/150 |
| 6,317,829 | B1 | 11/2001 | Van Oorschot | |
| 6,870,930 | B1 * | 3/2005 | Kim et al. | 380/42 |
| 6,914,637 | B1 * | 7/2005 | Wolf et al. | 348/473 |
| 2001/0015919 | A1 * | 8/2001 | Kean | 365/200 |
| 2001/0037307 | A1 * | 11/2001 | Kori et al. | 705/57 |
| 2001/0052070 | A1 * | 12/2001 | Oishi et al. | 713/151 |
| 2002/0152387 | A1 * | 10/2002 | Asano | 713/176 |
| 2003/0145336 | A1 * | 7/2003 | Matsuzaki et al. | 725/136 |
| 2004/0202183 | A1 * | 10/2004 | Thubert et al. | 370/395.31 |

FOREIGN PATENT DOCUMENTS

| | | | |
|---|---|---|---|
| EP | 0784392 | * | 7/1997 |
| EP | 1282261 A | | 2/2003 |

OTHER PUBLICATIONS

Menezes et al, "Handbook of Applied Cryptology", CRC Press LLC, 1997, USA, XP002306245, p. 652.

* cited by examiner

*Primary Examiner*—Kambiz Zand
*Assistant Examiner*—Aubrey H Wyszynski
(74) *Attorney, Agent, or Firm*—McAndrews, Held & Malloy, Ltd.

(57) ABSTRACT

Aspects of an encryption/decryption key generation and distribution may include generating one or more keys for use by one of a plurality of encryption/decryption devices coupled to a serial link within a chip. The generated keys may be transmitted via, for example, a high speed serial link to which one or more of the encryption/decryption devices in the chip may be coupled. The encryption/decryption devices coupled to the serial link may be adapted to examine or identify the transmitted key packets on the serial link and determine whether a particular key packet contains a key that which should be utilized by a particular one of the encryption/decryption devices. Upon identification of a key, the key may subsequently be processed and/or utilized by an integrated encryption/decryption processor associated with the encryption/decryption device to which the encryption key belongs.

26 Claims, 4 Drawing Sheets

METHOD AND SYSTEM FOR DATA ENCRYPTION/DECRYPTION KEY GENERATION AND DISTRIBUTION

CROSS-REFERENCE TO RELATED APPLICATIONS/INCORPORATION BY REFERENCE

This application makes reference to, claims priority to and claims the benefit of U.S. Provisional Patent Application Ser. No. 60/455,289 entitled "System and Method for Data Encryption/Decryption Key Generation and Distribution" filed on Mar. 17, 2003.

This application also makes reference to:

U.S. patent application Ser. No. 10/414,844 entitled "Method And System For Data Encryption And Decryption" filed on Apr. 16, 2003;

U.S. patent application Ser. No. 10/414,724 entitled "Method And System For Controlling An Encryption/Decryption Engine Using Descriptors" filed on Apr. 16, 2003;

U.S. patent application Ser. No. 10/417,051 entitled "Method And System For Secure Access And Processing Of An Encryption/Decryption Key" filed on Apr. 16, 2003; and U.S. patent application Ser. No. 10/414,575 entitled "Method And System For Data Encryption And Decryption" filed on Apr. 16, 2003.

The above stated applications are incorporated herein by reference in their entirety.

FIELD OF THE INVENTION

Certain embodiments of the invention relate to data security. More specifically, certain embodiments of the invention relate to a method and system for encryption and decryption key generation and distribution.

BACKGROUND OF THE INVENTION

In some conventional encryption applications, it is necessary to send data to a hard disk to be encrypted and retrieve data from the hard disk for decryption. One such application is personal video recording (PVR). In such systems, the encryption/decryption functions are implemented by separate devices between the ATA host adapter and the ATA bus connector. ATA stands for AT Attachment, a standardized interface used by storage devices such as hard disk drives, CD drives and DVD drives. ATA compatible drives may also be referred to as integrated drive electronics (IDE) drives. One drawback with conventional separate device implementations is that unencrypted or "clear" data is available at the interface between the ATA host adapter and the external encryption/decryption chip, and can be intercepted and stored in unencrypted form.

The encryption used in conventional systems is not particularly "strong" and could be broken relatively easily. For this reason, many data processing systems rely on encryption/decryption keys that require large amounts of bits. For example, some systems may utilize n-bit keys where n may be 64, 128, 192 and 256, for example. Notwithstanding, the greater the value of n in the n-bit wide key data, the more difficult it is to handle and process the key data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for encryption/decryption key generation and distribution. The method for encryption/decryption key generation and distribution may include generating one or more keys for use by one of a plurality of encryption/decryption devices coupled to a serial link within a chip. The generated keys may be transmitted via, for example, a high speed serial link to which one or more of the encryption/decryption devices in the chip may be coupled. The encryption/decryption devices coupled to the serial link may be adapted to examine or identify the transmitted key packets on the serial link and determine whether a particular key packet contains a key that should be utilized by a particular one of the encryption/decryption devices. Upon identification of a key, the key may subsequently be processed and/or utilized by an integrated encryption/decryption processor associated with the encryption/decryption device to which the encryption key belongs.

Prior to transmitting a key, the key may be serialized and then packetized or encapsulated into a key packet. An address of the encryption/decryption device to which the key belongs may be encapsulated along with the key into the key packet. An encryption/decryption device may receive the key packet and compare the address encapsulated within the key packet with its own address. The key may be extracted from the key packet if the comparison results in the encapsulated address within the key packet matching the address of the encryption/decryption device. An encryption/decryption processor associated with the encryption/decryption device may utilize the extracted key for an encryption or a decryption operation.

Another embodiment of the invention provides, a machine-readable storage, having stored thereon a computer program having at least one code section for encryption/decryption key generation and distribution, the at least one code section executable by a machine for causing the machine to perform the steps as described above.

In another embodiment of the invention, a system for encryption/decryption key generation and distribution may be provided. The system may include at least one on-chip key generation module and a serial link may be coupled to the on-chip key generation module. At least one on-chip encryption/decryption processing module may be coupled to the serial link. The on-chip key generation module may include at least one key generator which may be adapted to generate at least one key for use by one of the encryption/decryption devices coupled to the serial link. The on-chip key generation module may further include at least one key transmitter which may be adapted to transmit the key via the serial link to one of the encryption/decryption devices. The on-chip encryption/decryption processing module may further include at least one key receiver adapted to receive and identify the transmitted key which may be associated with one of the encryption/decryption devices. The on-chip encryption/decryption processing module may further include at least one encryption/decryption processor which may be adapted to process the identified key which may be associated with the encryption/decryption device.

Prior to transmitting a key, the key transmitter may be adapted to serialize and then packetize or encapsulate the key into one or more key packets. An address of the encryption/decryption device to which the key belongs may be encapsulated along with the key into the key packet. The key receiver associated with an encryption/decryption device may receive the key packet and compare the address encapsulated within the key packet with the encryption/decryption devices own address. The key may be extracted from the key packet if the comparison results in the encapsulated address within the key packet matching the address of the encryption/decryption device. An encryption/decryption processor associated with the encryption/decryption device may utilize the extracted key for an encryption or a decryption operation. The key generator and the key transmitter may be integrated within a single on-chip key module. The key receiver and the integrated encryption/decryption processor may also be integrated within a single on-chip key processor module. In this regard, the chip may include an on-chip key module and an on-chip key processor module.

These and other advantages, aspects and novel features of the present invention, as well as details of a illustrated embodiment thereof, will be more fully understood from the following description and drawings.

DETAILED DESCRIPTION OF THE INVENTION

Certain embodiments of the invention provide a method and system for encryption/decryption key generation and distribution. The method for encryption/decryption key generation and distribution may include generating one or more keys for use by one of a plurality of encryption/decryption devices coupled to a serial link within a chip. The generated keys may be transmitted via, for example, a high speed serial link to which one or more of the encryption/decryption devices in the chip may be coupled. The encryption/decryption devices coupled to the serial link may examine or identify the transmitted key packets on the serial link and determine whether a particular key packet contains a key that should be utilized by a particular one of the encryption/decryption devices. Upon identification of a key, the key may subsequently be processed and/or utilized by an integrated encryption/decryption processor associated with the encryption/decryption device to which the encryption key belongs.

Certain embodiments of the invention may be implemented in a memory to bus interface data encryption/decryption system. A memory to bus interface data encryption and decryption may include encrypting data by a encryption/decryption engine or processor and transferring the encrypted data across a first bus interface to a data processing and/or storage device coupled to the first bus interface. The encryption engine may receive encrypted data from a device coupled to the first bus interface and decrypt the received encrypted data. In this regard, unencrypted data never traverses across the first bus interface, and is thereby not accessible to devices coupled to the first bus interface. An encryption function and a decryption function associated with the encryption/decryption engine may be integrated within a bus adapter, for example, an IDE bus adapter.

In an embodiment of the invention, the method for data encryption may include the integration of an encryption function into an ATA host adapter, thereby eliminating the presence of unencrypted data on an external ATA bus to which the ATA host adapter may be coupled. The method may utilize 3DES/DES encryption/decryption, which may be stronger than encryption/decryption methods utilized in conventional systems, and hence more difficult to break.

In one embodiment of the invention, the IDE host interface may be a two channel ATA host adapter that conforms to the AT Attachment with Packet Interface (ATA/ATAPI-5) specification. In this regard, the two channel host adapter may include a primary and a secondary channel. The IDE host interface may be adapted to function as a bus bridge between an internal local bus and an external ATA bus to support programmed I/O (PIO) data transfer. The IDE host interface may also include a memory bus interface and DMA controllers to support legacy multiword DMA as well as ultra-DMA data transfer protocols. Cyclic redundancy check (CRC) generation for ultra-DMA transfers may also be performed in compliance with the ATA/ATAPI-5 specification.

In accordance with an aspect of the invention, pin count may be reduced by utilizing a design that shares a single ATA address, data, and chip select busses between the primary and secondary channels. In this arrangement, each channel may be adapted to support a master and a slave device for a maximum of four IDE devices. The design may include two 64-bit 3DES/DES encryption/decryption cores that can optionally be used to encrypt or decrypt DMA transfers to or from IDE devices. Configuration and control of the encryption/decryption operation may be accomplished using a DES control register. Two or more 128-bit key registers, for example, may also be provided and these registers may be programmed using a two-wire serial key bus from a transport block.

By integrating the encryption/decryption function into the IDE host interface, cost may be significantly reduced relative to an external encryption/decryption solution. Moreover, the presence of unencrypted data on the external ATA bus is also eliminated, thereby eliminating data intrusion. The 3DES/DES encryption may be more robust and accordingly, more difficult to decipher than conventional methods.

Figure 1:
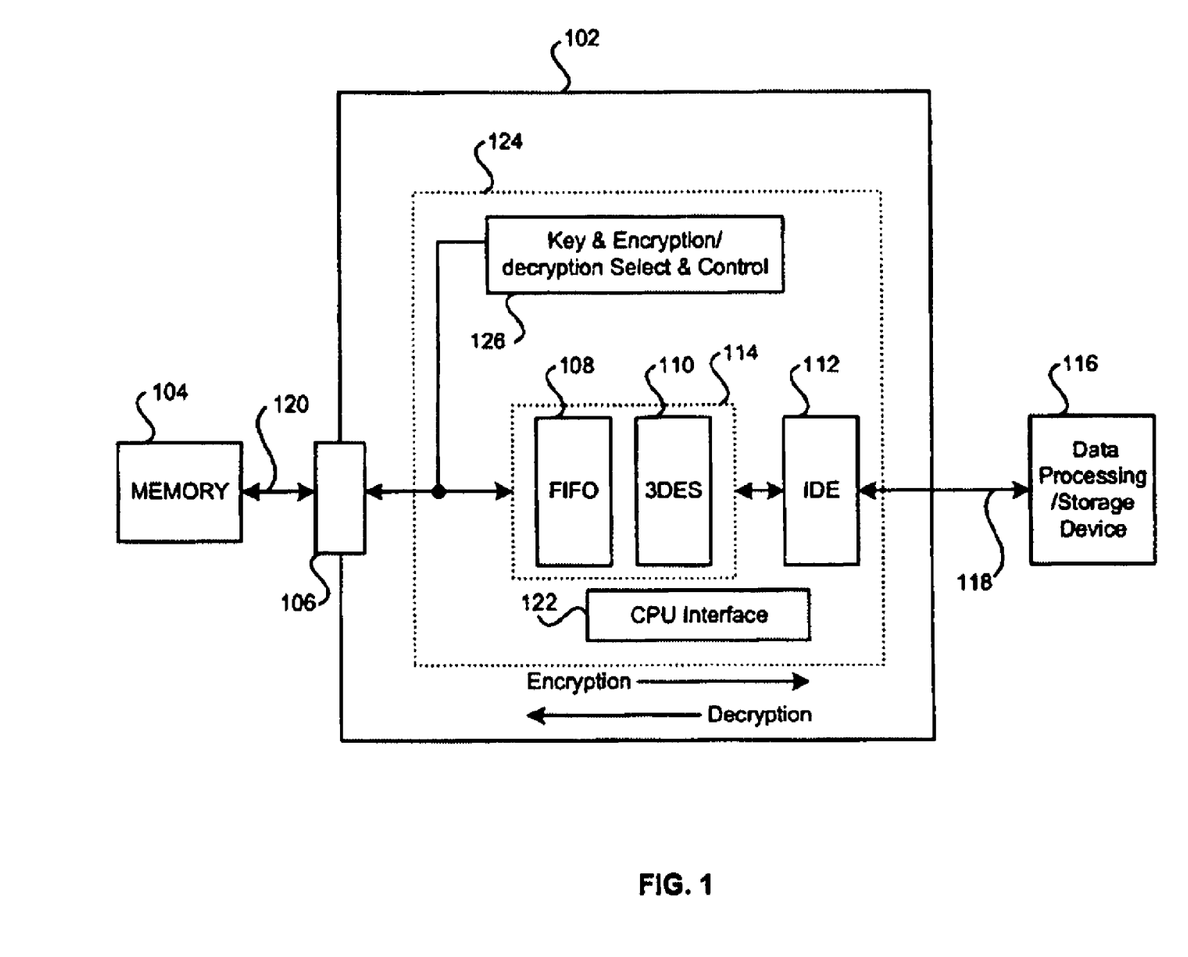
FIG. 1 is a block diagram of an exemplary system for memory to IDE encryption/decryption in accordance with an embodiment of the invention.

FIG. 1 is a block diagram of an exemplary system for memory to IDE encryption/decryption in accordance with an embodiment of the invention. Referring to FIG. 1, there is shown a chip 102 having integrated therein, an IDE controller block 124. IDE controller block 124 may include a FIFO block 108, 3DES block 110, IDE interface block 112, CPU interface 122 and key and encryption/decryption select and control block 126. The 3DES block 110 and the FIFO block 108 may form an encryption/decryption processor block 114. Chip 102 may include a memory and/or bus interface block 106.

The IDE interface block 112 may be coupled to an external data processing/storage device 116 via a first bus and/or bus interface 118. The first bus 118 may be an ATA bus, although the invention is not limited in this regard. Alternatively, the first bus 118 may be, for example, a SCSI bus, a PCI bus, USB or other suitable bus. The external data processing/storage device 116 may be, for example, a hard disk, memory or data processing or storage device.

Chip 102 may also include a bus interface block 106. The FIFO block 108 may be coupled to the bus interface block 106. A memory 104 may be coupled to the bus interface block 106 via a second bus 120. The memory 104 may be a random access memory (RAM) such as a dynamic RAM (DRAM). In this regard, the memory and/or bus interface block 106 may be a DRAM controller, for example. The exemplary system of FIG. 1 could be part of a personal video recording (PVR) system.

Although chip 102 may include IDE controller block 124, the invention is not limited in this regard. In general, chip 102 may alternatively include any suitable bus controller block such as a PCI controller block or SCSI controller block, instead of IDE controller block 124. In this regard, the IDE controller block 124 may be replaced by a PCI controller block or a SCSI controller block respectively. For example, in a case where IDE controller block 124 is replaced by a PCI controller block, then IDE interface block 112 may be replaced by a PCI interface block. In a case where IDE controller block 124 is a SCSI controller block, then IDE interface block 112 may be replaced by a SCSI interface block. Accordingly, the PCI interface block or the SCSI interface block may be coupled to the external data processing/storage device 116 via the first bus 118.

The key and encryption/decryption select and control block 126 may include suitable control logic and/or circuitry that may be adapted to select a function to be performed by the encryption/decryption processor block 114. In this regard, the encryption/decryption processor block 114 may be adapted to select or deselect one of an encryption operation, a decryption operation and a bypass function. The control logic and/or circuitry in the key and encryption/decryption select and control block 126 may be further adapted to facilitate selection and control of encryption and decryption keys to be utilized by the 3DES block 110. In this regard, the key and encryption/decryption select and control block 126 may control which of a plurality of keys may be utilized by the 3DES block 110. The key and encryption/decryption select and control block 126 may further include suitable control logic and/or circuitry that may be adapted to provide various select signals that may be used to route data throughout chip 102 when any of the encryption, decryption, or bypass functions or operations may be required.

The CPU interface block 122 may include suitable logic and/or circuitry that may be adapted to provide control of the operation of chip 102 by an external processor. The external processor may be a host processor.

In operation, data to be encrypted by the encryption/decryption processor block 114 and transferred to the external data processing/storage device 116, may be received from the memory 104 via the second bus 120. The data to be encrypted may be transferred to the encryption/decryption processor block 114 where it may be buffered in FIFO buffer 108. The memory or bus interface block 106 may be adapted to control the transfer of the data to be encrypted from the memory 104 to the FIFO buffer 108. The received data in the FIFO buffer 108 may be encrypted by the 3DES block 110 and communicated to the IDE interface block 112. The IDE interface block 112 may be adapted to transfer the encrypted data to the external data processing/storage device 116 via the first bus 118. In this regard, the unencrypted data may never be placed on the first bus 118 where it may be accessible by other devices coupled to the first bus.

In operation, encrypted data stored in the external data processing/storage device 116 may be transferred from the external data processing/storage device 116 for decryption by the encryption/decryption processor block 114. The IDE interface block 112 may be adapted to control the transfer of the encrypted data from the external data processing/storage device 116 via the first bus 118. To facilitate decryption, the transferred encrypted data may first be buffered in the FIFO block 108 and then decrypted by the 3DES block 110. Subsequent to decryption, the decrypted data may be transferred to the memory 104. The memory and/or bus interface block 106 may be adapted to facilitate the transfer of the decrypted data to the memory 104 via bus 120. In this regard, unencrypted data may never be placed on the first bus 118 where it might be accessible by other devices coupled to the first bus 118.

Figure 2:
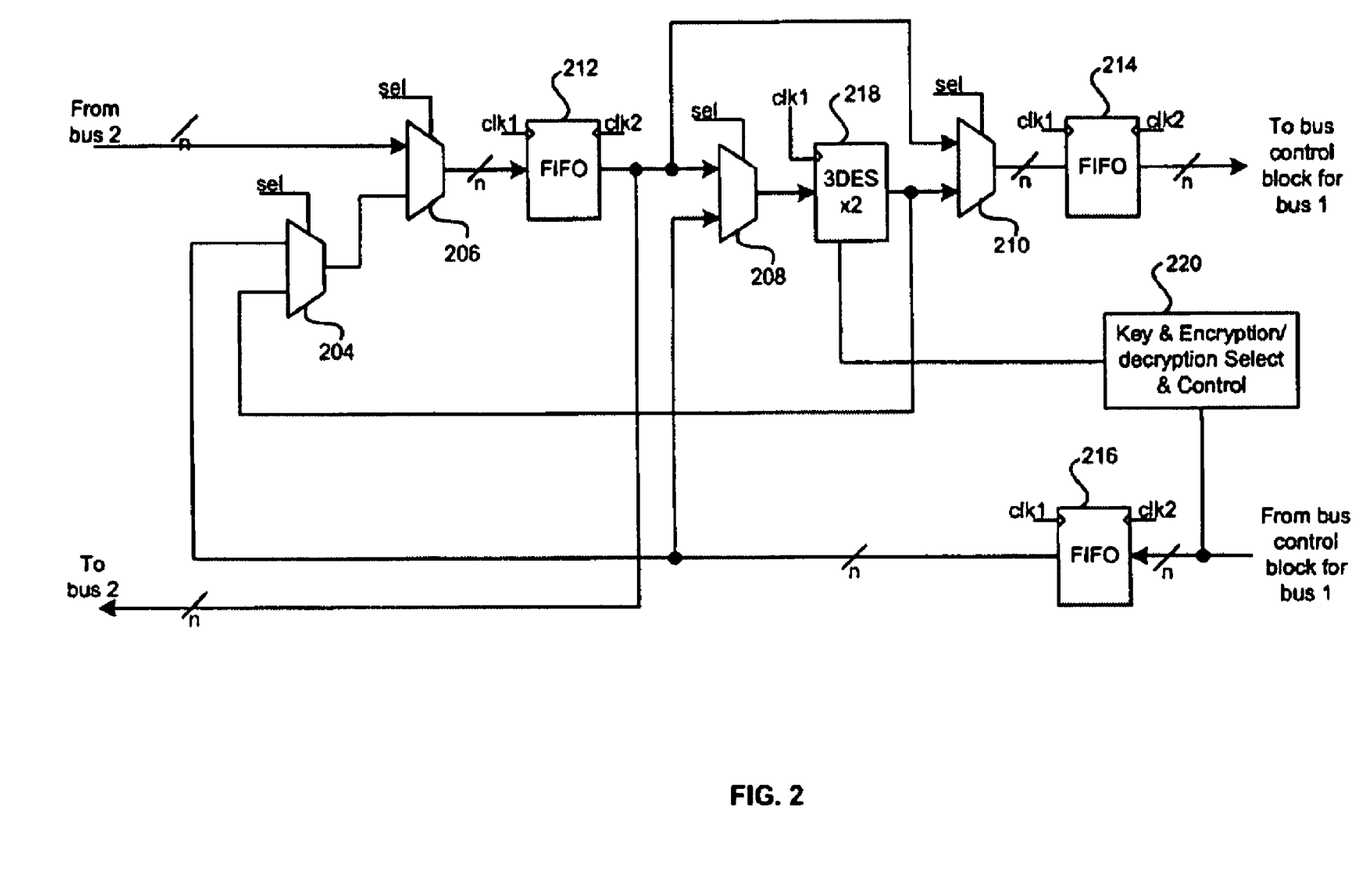
FIG. 2 is a block diagram illustrating the encryption/decryption of data using exemplary memory to IDE system of FIG. 1 in accordance with an embodiment of the invention.

FIG. 2 is a block diagram illustrating the encryption/decryption of data using exemplary memory to IDE system of FIG. 1 in accordance with an embodiment of the invention. Referring to FIG. 2, there are shown selectors 204, 206 208, 210, FIFO buffers 212, 214, 216, 3DES block 218 and key and encryption/decryption select and control block 220. The selectors 204, 206, 208, 210 may be multiplexers. FIFO 212 may be a bus buffer, FIFO 214 may be a read buffer and FIFO 216 may be a write buffer. The selectors 204, 206 208, 210, FIFO buffers 212, 214, 216 and 3DES block 218 may be adapted to handle n-bit wide data. In one aspect of the invention, n may be, for example, 128 or other suitable value. Each of the FIFOs 212, 214, 216 may be adapted to handle a first clock domain clk1 associated with a first bus and a second clock domain clk2 associated with a second bus. The first clock domain may be an 81 MHz clock and the second clock domain may be a 33 MHz clock, although the invention may not be limited in this regard. In one aspect of the invention, a plurality of 3DES block 218 may be provided for encrypting and decrypting data.

The key and encryption/decryption select and control block 220 may include suitable logic that may be used to select or deselect a first and/or a second input of each of the selectors 204, 206, 208, 210. The key and encryption/decryption select and control block 220 may use the select pins of selectors 204, 206, 208, 210 to select or deselect a particular selector. In this regard, the key and encryption/decryption select and control block 220 may be used to route data through chip 102 during an encryption or decryption operation, or a bypass function.

During encryption, unencrypted data may be received from a device connected to a second bus. The device may be a memory device such as memory 104 (FIG. 1). Selector 206 may be enabled via a select pin, which may be adapted to permit the unencrypted data to be loaded into FIFO buffer 212 via a first input of selector 206. The buffered unencrypted data may be encrypted by the 3DES block 218. In this regard, the selector 208 may be enabled by its select pin. While selector 210 is disabled or deselected via its select pin, the unencrypted data may then be communicated from the FIFO 212 through a first input of selector 208 to the 3DES block 218. The 3DES block may encrypt the unencrypted data. Selector 210 may be enabled by its select pin and a second input of selector 210 may communicate any resulting encrypted data to the FIFO 214. The encrypted data may then be communicated via a first bus, to for example, a memory or other processing device connected to the first bus. In this regard, the data being transferred over the first bus may be encrypted.

In accordance with another aspect of the invention, a bypass function may also be provided. In a case where encrypted data may be transferred from the memory connected to the first bus to a memory or processing device connected to the second bus, the 3DES block 218 may be bypassed. In this case, the selector 208 may be deselected or disabled by its select pin. However, selector 210 may be selected and a first input of selector 210 may be used to facilitate transfer of the encrypted data from the FIFO 212 to FIFO 214.

During decryption, encrypted data may be received from a device connected to the first bus. The device may be an external data processing/storage device 116 of FIG. 1. The encrypted data may be buffered in FIFO 216. Selector 208 may be enabled by its select pin and the encrypted data may be communicated to 3DES block 218 via a second input of selector 208. After the encrypted data is decrypted by 3DES block 218, while selector 110 may be deselected or disabled by its select pin, selector 204 and selector 206 may be enabled by their respective select pins. The decrypted data may be transferred to the buffer 212 via a second input of selector 204 and a second input of selector 206 respectively. While selector 208 may be deselected or disabled by its select pin, the decrypted data may be transferred from the FIFO buffer 212 to the memory coupled to the second bus.

Figure 3:
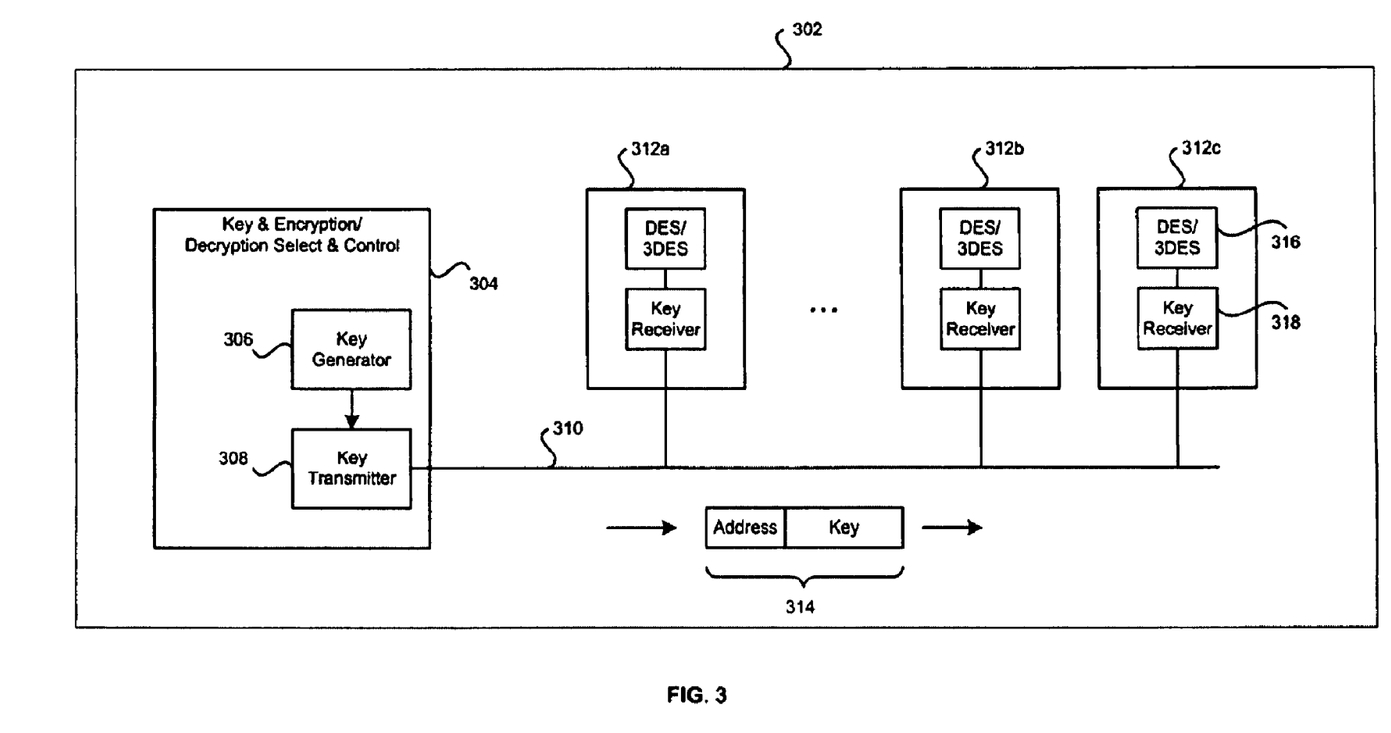
FIG. 3 is a block diagram of an exemplary system for encryption/decryption key generation and distribution in accordance with an embodiment of the invention.

FIG. 3 is a block diagram of an exemplary system for encryption/decryption key generation and distribution in accordance with an embodiment of the invention. Referring to FIG. 3, there is shown a block diagram of a chip 302 which may include a key and encryption/decryption select and control block 304, a serial bus or link 310 and a plurality of encryption/decryption devices 312a, 312b, 312c. The key and encryption/decryption select and control block 304 may include at least a key generator 306, a key transmitter 308 and other suitable select and/or control logic and/or circuitry not shown. Each of the encryption/decryption devices 312a, 312b, 312c may include an encryption/decryption processor and a key receiver. For example, encryption/decryption device 312c may include an encryption/decryption processor 316 and a key receiver 318.

Serial link 310 may be adapted to couple each of the encryption/decryption devices 312a, 312b, 312c to key transmitter 308. In one aspect of the invention, serial link 310 may be a high speed serial bus. An exemplary key packet 314 is illustrated and may include at least an address field and a key field. Although the key generator 306 and the key transmitter 308 are separately illustrated, the invention is not so limited. In this regard, the key generator 306 and the key transmitter 308 may be integrated into a single key generation module. Similarly, although the encryption/decryption processor and the key receiver of each of the encryption/decryption devices 312a, 312b, 312c are separately illustrated, the encryption/decryption processor and the key receiver of each of the encryption/decryption devices 312a, 312b, 312c may be integrated into a single encryption/decryption processing module. For example, key receiver 318 and DES/3DES encryption/decryption processor 316 may be integrated into a single encryption/decryption processing module.

The key and encryption/decryption select and control block 304 may operate in a manner similar to the key and encryption/decryption select and control block 126 of FIG. 1. Similarly, the encryption/decryption devices 114 may operate in a manner similar to the encryption/decryption processor block 114 of FIG. 1. Notwithstanding, in accordance with an embodiment of the invention, key generator 306 may be adapted to generate one or more keys for use by one of the encryption/decryption devices 312a, 312b, 312c coupled to serial link 310. In accordance with one aspect of the invention, each of the encryption/decryption devices 312a, 312b, 312c coupled to serial link 310 may be assigned a unique address.

Key transmitter 308 may be adapted to transmit the generated keys via the high speed serial link 310 to which the encryption/decryption devices 312a, 312b, 312c may be coupled. Prior to transmitting the keys, the key transmitter 308 may be adapted to serialize and then packetize or encapsulate the keys into one or more key packets. For example, key transmitter 308 may serialize and then packetize or encapsulate the keys into one or more key packets, such as key packet 314. An address of the encryption/decryption device to which the key belongs may be encapsulated along with the keys into the key packet 314.

Each of the key receivers associated with each of the encryption/decryption devices 312a, 312b, 312c may be adapted to listen in on the serial link 310 and examine each of the key packets that traverses the serial link 310. For example, key receiver 318 associated with encryption/decryption devices 312c may be adapted to listen in on the serial link 310 and examine each of the key packets that traverses the serial link 310. During examination of the key packets that traverses the serial link 310, each of the encryption/decryption devices 312a, 312b, 312c may determine whether the address in the key packet may be equivalent to its own uniquely assigned address.

In a case where a particular encryption/decryption device identifies and determines that its uniquely assigned address is similar to the address in the key packet, then that encryption/decryption device may parse or extract the key from the key packet. The integrated encryption/decryption processor associated with that encryption device may be adapted to encrypt or decrypt data using the parsed or extracted encryption key, depending on the type of operation to be performed.

For illustrative purposes, key packet 314 may have encapsulated in its address field, the address of encryption decryption device 312c and a key to be used by encryption/decryption processor 316 for an encryption or a decryption operation. In this regard, key receiver 318 associated with an encryption/decryption device 312c may receive the key packet 314 via serial link 310 and compare the address encapsulated within the key packet 314 with its own address. In this case, the address in the key packet will match the address of encryption/decryption device 312c. Accordingly, key receiver 318 may be adapted to parse or extract the key from the key packet 314 since the addresses match and the key packet 314 belongs to encryption/decryption device 312c. The parsed or extracted key may be made available to encryption/decryption processor 316 for use during an encryption or a decryption operation.

Although FIG. 1 provides an exemplary system in which the present invention may be utilized, the invention is not limited in this regard. The invention may also be utilized in an memory to memory encryption/decryption system. U.S. Provisional patent application Ser. No. 10/41,844 filed on Mar. 14, 2003 provides an exemplary memory to memory system in which the present invention may be utilized and is hereby incorporated by reference in its entirety.

Figure 4:
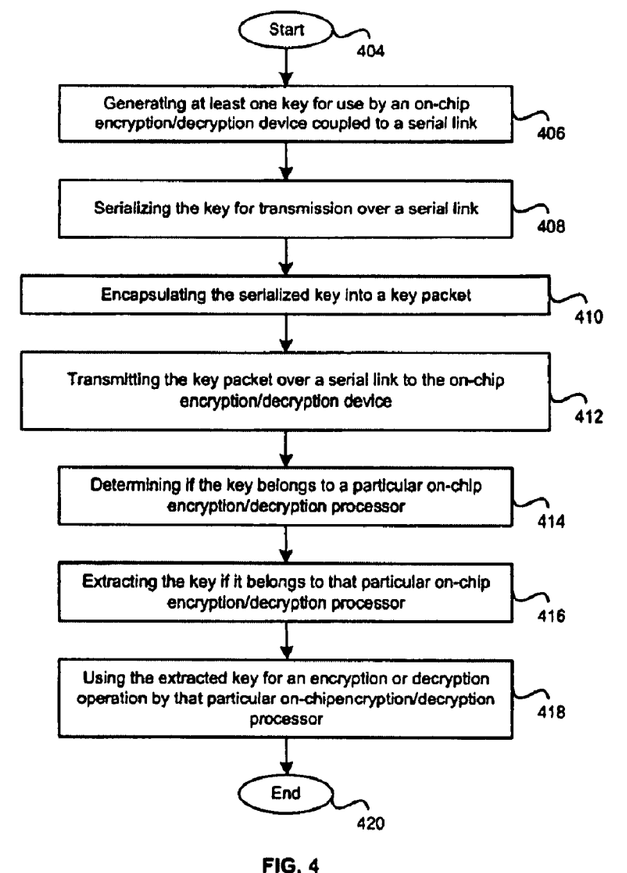
FIG. 4 is a flow chart of exemplary steps for encryption/decryption key generation and distribution in accordance with an embodiment of the invention.

FIG. 4 is a flow chart of exemplary steps for encryption/decryption key generation and distribution in accordance with an embodiment of the invention. Referring to FIG. 4, the exemplary steps may start with step 404. Subsequently, in step 406, at least one key may be generated within a chip for use by an on-chip encryption/decryption device which may be coupled to a serial link. In step 408, the key may be serialized for transmission over the serial link. Additionally, in step 410, the serialized key may be encapsulated in a key packet for transmission over the serial link. In step 412, the key packet may be transmitted over the serial link to the on-chip encryption/decryption device. In step 414, a determination may be made as to whether the transmitted key belongs to a particular encryption/decryption processor. In step 416, the key may be extracted if it belongs to that particular encryption/decryption processor. In step 418, the key may be utilized by that particular encryption/decryption processor for an encryption or decryption operation. The exemplary steps may end with step 420.

In another aspect of the invention, a 3DES encryption/decryption simulation may be provided to illustrate exemplary encryption and decryption processes. During the simulation, an input data may be acquired from an input file. For example, an input file, namely test1.encrypt.dat, may contain the following information:

0 0 01234567 89abcdef fedcba98 76543210
23456789 abcdef01
456789ab cdef0123

In this regard, the input file may specify a 3DES encryption using a key of, for example 01234567 89abcdef fedcba98 76543210. The two 64-bit words of data may be 23456789abcdef01 and fedcba9876543210.

Upon executing the 3DES operation using, for example, the 3DES block 208 of FIG. 2, with the test1.encrypt.dat input file, an output file may be generated. The output file, namely test1.encrypt.dat.out, may be generated. The contents of the generated test1.encrypt.dat.out file may be as follows:

a47606af 132eeff7
792e2b91 7c75dce4

The encrypted data in test1.encrypt.dat.out file may be decrypted using the following test1.decrypt.dat.in file. The contents of the test1.decrypt.dat.in file may be as follows.

1 0 01234567 89abcdef fedcba98 76543210
a47606af 132eeff7
792e2b91 7c75dce4

Upon decryption of test1.decrypt.dat.in file, an output file, namely test1.decrypt.dat may be generated. The contents of test1.decrypt.dat file may be as follows.

23456789 abcdef01
456789ab cdef0123

In this case, the decryption returns the original data.

Accordingly, the present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for generating and distributing an encryption/decryption key, the method comprising:
generating at least one key by a key generator integrated within a chip for use by one of a plurality of addressable encryption/decryption devices coupled to a broadcast serial link within said chip;
transmitting directly from said key generator, said at least one key via said broadcast serial link to said one of said plurality of addressable encryption/decryption devices;
identifying said transmitted at least one key by said one of said plurality of addressable encryption/decryption devices; and
processing said identified at least one key by an integrated encryption/decryption processor associated with said one of said plurality of addressable encryption/decryption devices, when said transmitted at least one key is associated with said one of said plurality of addressable encryption/decryption devices.

2. The method according to claim 1, comprising serializing said at least one key.

3. The method according to claim 2, comprising encapsulating said at least one key into a key packet.

4. The method according to claim 3, wherein said encapsulating comprises encapsulating an address of said one of said plurality of addressable encryption/decryption devices in said key packet.

5. The method according to claim 4, wherein said identifying comprises:
receiving said key packet by said one of said plurality of addressable encryption/decryption devices; and
comparing said address encapsulated within said key packet to said address of said one of said plurality of addressable encryption/decryption devices.

6. The method according to claim 5, comprising extracting said at least one key from said key packet, when said comparison results in said encapsulated address within said key packet matching said address of said at least one of said plurality of addressable encryption/decryption devices.

7. The method according to claim 6, comprising utilizing said extracted at least one key by said one of said plurality of addressable encryption/decryption devices for one of: an encryption and a decryption operation, if said comparison results in said encapsulated address within said key packet matching said address of said one of said plurality of addressable encryption/decryption devices.

8. The method according to claim 1, wherein said broadcast serial link is a high-speed serial link to which each of said plurality of addressable encryption/decryption devices is coupled.

9. A machine-readable storage having stored thereon, a computer program having at least one code section for generating and distributing an encryption/decryption key, the at least one code section being executable by a machine for causing the machine to perform steps comprising:

generating at least one key by a key generator integrated within a chip for use by one of a plurality of addressable encryption/decryption devices coupled to a broadcast serial link within a chip;

transmitting said at least one key directly from said key generator, via said broadcast serial link to said one of said plurality of encryption/decryption devices;

identifying said transmitted at least one key by said one of said plurality of encryption/decryption devices; and processing said identified at least one key by an integrated encryption/decryption processor associated with said one of said plurality of addressable encryption/decryption devices, when said transmitted at least one key is associated with said one of said plurality of addressable encryption/decryption device.

10. The machine-readable storage according to claim 9, comprising code for serializing said at least one key.

11. The machine-readable storage according to claim 10, comprising code for encapsulating said at least one key into a key packet.

12. The machine-readable storage according to claim 11, where said code for encapsulating encapsulates an address of said one of said plurality of addressable encryption/decryption devices in said key packet.

13. The machine-readable storage according to claim 12, wherein said identifying comprises:

code for receiving said key packet by said one of said plurality of addressable encryption/decryption devices; and code for comparing said address encapsulated within said key packet to said address of said one of said plurality of addressable encryption/decryption devices.

14. The machine-readable storage according to claim 13, comprising code for extracting said at least one key from said key packet, if said comparison results in said encapsulated address within said key packet matching said address of said one of said plurality of addressable encryption/decryption devices.

15. The machine-readable storage according to claim 14, comprising code that utilizes said extracted at least one key for one of: an encryption and a decryption operation, by said one of said plurality of addressable encryption/decryption devices if said comparison results in said encapsulated address within said key packet matching said address of said one of said plurality of addressable encryption/decryption devices.

16. The machine-readable storage according to claim 9, wherein said broadcast serial link is a high-speed serial link to which each of addressable said plurality of encryption/decryption devices is coupled.

17. A system for generating and distributing an encryption/decryption key, the system comprising:

at least one on-chip key generation module;

a broadcast serial link coupled to said on-chip key generation module;

at least one on-chip encryption/decryption processing module coupled to said broadcast serial link; and wherein said at least one on-chip key generation module comprises at least one key generator integrated within a chip that enables generation of at least one key for use by one of a plurality of addressable encryption/decryption devices coupled to said broadcast serial link, said at least one on-chip key generation module comprises at least one key transmitter that enables transmission of said at least one key via said broadcast serial link to said one of said plurality of encryption/decryption devices.

18. The system according to claim 17, wherein said at least one on-chip encryption/decryption processing module comprises at least one key receiver that enables reception and identification of said transmitted at least one key which is associated with said one of said plurality of addressable encryption/decryption devices.

19. The system according to claim 18, wherein said at least one on-chip encryption/decryption processing module comprises at least one encryption/decryption processor that enables processing of said identified at least one key which is associated with said one of said plurality of addressable encryption/decryption devices.

20. The system according to claim 19, wherein said at least one key transmitter enables serialization of said at least one key.

21. The system according to claim 20, wherein said at least one key transmitter enables encapsulation of said at least one key into a key packet.

22. The system according to claim 21, wherein said at least one key transmitter enables encapsulation of an address of said one of said plurality of addressable encryption/decryption devices in said key packet.

23. The system according to claim 22, wherein said at least one key receiver enables receiving of said key packet by said one of said plurality of addressable encryption/decryption devices, and comparing of said address encapsulated within said key packet to said address of said one of said plurality of addressable encryption/decryption devices.

24. The system according to claim 23, wherein said at least one key receiver enables extraction of said at least one key from said key packet, when said comparison results in said encapsulated address within said key packet matching said address of said one of said plurality of addressable encryption/decryption devices.

25. The system according to claim 24, wherein said at least one integrated encryption/decryption processor of said one of said plurality of addressable encryption/decryption devices utilizes said extracted at least one key for one of: an encryption and a decryption operation, when said comparison results in said encapsulated address within said key packet matching said address of said one of said plurality of encryption/decryption devices.

26. The system according to claim 17, wherein said broadcast serial link is a high-speed serial link.

* * * * *